United States Patent [19]

Okutani et al.

[11] Patent Number: 5,621,051
[45] Date of Patent: Apr. 15, 1997

[54] PROCESS FOR PREPARATION OF POLYURETHANE-POLYCARBODIIMIDE FOAM

[75] Inventors: Tatsuya Okutani; Yasuo Imashiro; Eiji Sasaki; Shiro Nagahata; Kiyotake Morimoto, all of Tokyo, Japan

[73] Assignee: Nisshinbo Industries, Inc., Tokyo, Japan

[21] Appl. No.: 617,430

[22] Filed: Mar. 18, 1996

Related U.S. Application Data

[63] Continuation of Ser. No. 128,077, Sep. 29, 1993, abandoned.

[30] Foreign Application Priority Data

Sep. 29, 1992 [JP] Japan .................................. 4-282293

[51] Int. Cl.[6] ......................................................... C08L 75/08
[52] U.S. Cl. ........................... 525/453; 525/460; 521/155; 521/170; 524/115; 524/178
[58] Field of Search ................................... 525/453, 460; 521/155, 170; 524/115, 178

[56] References Cited

U.S. PATENT DOCUMENTS 3,485,797  12/1969  Robins ...................................... 260/57
5,126,305   6/1992  Eling ......................................... 502/167

FOREIGN PATENT DOCUMENTS

| 0381324 | 8/1990 | European Pat. Off. . |
| 2162405 | 7/1973 | France . |
| 2289538 | 5/1976 | France . |
| 1177172 | 1/1970 | United Kingdom . |
| 2074176 | 10/1981 | United Kingdom . |

OTHER PUBLICATIONS

Ulrich et al., Journal of Cellular Plastics, "Chemistry and Properties of Low Density Poly(Carbodiimide) Foams", vol. 21, No. 5, pp. 350–357 (1985).

Papa et al., Journal of Cellular Plastics, "Hybrid Phenolic/Urethane Foams", pp. 258–266, Sep./Oct. 1979.

*Primary Examiner*—W. Robinson H. Clark
*Attorney, Agent, or Firm*—Wenderoth, Lind & Ponack

[57] ABSTRACT

A process for preparation of a polyurethane-polycarbodiimide foam which comprises reacting a polyol component containing a benzylic ether type phenol resin having hydroxymethyl groups with an organic polyisocyanate component in the presence of an organotin catalyst for urethane formation and a carbodiimidating catalyst. According to this process, it is unnecessary to use fluorine-containing halogenated hydrocarbons as a blowing agent, and blowing on the spot is possible using a spray blowing machine or the like.

11 Claims, No Drawings

PROCESS FOR PREPARATION OF POLYURETHANE-POLYCARBODIIMIDE FOAM

This application is a continuation of now abandoned Ser. No. 08/128,077 filed Sep. 29, 1993, now abandoned.

This invention relates to a polyurethane-polycarbodiimide foam such that it is unnecessary to use fluorine-containing halogenated hydrocarbons as a blowing agent and blowing on the spot is possible using a spray blowing machine or the like.

Heretofore, for the purpose of prevention of dew condensation, thermal insulation, etc. of buildings, rigid polyurethane foams have been applied onto the wall surface, etc. of the buildings by spray blowing on the spot. In stock solutions for polyurethane foams which have hitherto been used, fluorine-containing halogenated hydrocarbons are used as a blowing agent in a rate of about 15 to about 40 wt. % of all the stock solutions. However, due to the problem of destruction of the ozone layer, the state of things are moving toward overall prohibition against use of fluorine-containing halogenated hydrocarbons in near future.

Thus, it is investigated to use water or the like as a blowing agent in place of fluorine-containing halogenated hydrocarbons, but when is used in a large amount, there arise disadvantages that the adhesive strength of the formed polyurethane foams lowers and physical properties such as brittleness lower, too. Moreover, in spray blowing, there also arise problems undesirable for control of blowing, such as increase of the liquid ratio (the ratio of the NCO component to the OH component) and increase of the viscosity of the stock solution.

The object of this invention is to provide a process for preparation of a polyurethane foam such that it is unnecessary to use fluorine-containing halogenated hydrocarbons as a blowing agent and blowing on the spot is possible, without any problem, using a spray blowing machine.

The present inventors have paid their attention to the fact that, as shown in the following reaction formula A, Reaction formula A

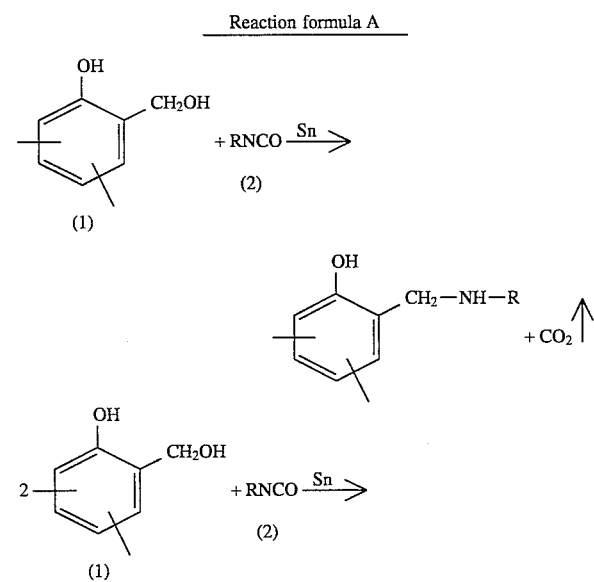

Reaction formula A

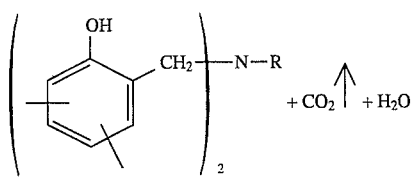

a benzylic ether type phenol resin containing hydroxymethyl groups (1) reacts with an organic isocyanate (2) in the presence of an organotin catalyst for urethane formation to generate carbon dioxide gas (for example, refer to Journal of Cellular Plastics, "Hybrid Phenolic/Urethane Foams", September/October 1979, pp 258–266, by Anthony J. Papa and Frank E. Critchfield, Union Carbide Corporation Technical Center, South Charleston, W. Va. 25303), and have tried to use a benzylic ether type phenol resin containing hydroxymethyl groups as a polyol component for formation of polyurethane foams.

However, blowing is insufficient by only carbon dioxide gas generated by the reaction of the hydroxymethyl groups of the benzylic ether type phenol resin with the organic isocyanate, and a desired foam of a low density (high extent of foaming) cannot be obtained.

The present inventors had further made investigations, and as a result they found that when a carbodiimidating catalyst is used, in addition to the organotin catalyst for urethane formation, as a catalyst in the reaction of the benzylic ether type phenol resin containing hydroxymethyl groups with the organic polyisocyanate, a reaction to generate carbon dioxide gas accompanying carbodiimide formation shown by the following reaction formula B Reaction formula B $$2R{-}NCO \rightarrow R{-}N{=}C{=}N{-}R + CO_2\uparrow$$

also occurs in addition to the reaction shown in the reaction formula A, and thereby it is possible to prepare a polyurethane-polycarbodiimide foam of a low density on which spray blowing is possible, and completed this invention.

Thus, according to this invention, there is provided a process for preparation of a polyurethane-polycarbodiimide foam which comprises reacting a polyol component containing a benzylic ether type phenol resin having hydroxymethyl groups with an organic polyisocyanate component in the presence of an organotin catalyst for urethane formation and a carbodiimidating catalyst.

The characteristic of this invention lies in using a benzylic ether type phenol resin having hydroxymethyl groups as at least part of the polyol component, and therein the "benzylic ether type phenol resin having hydroxymethyl groups" is a kind of phenol resin obtained by reacting phenol with formaldehyde at a temperature of 100° to 130° C. using a catalyst comprising a salt of a divalent metal with naphthenic acid, carboxylic acid or the like, its properties and state can be changed, depending on polymerization conditions, in a range from viscous liquid, through semi-solid, to solid, and it can be prepared, for example, according to a process disclosed in U.S. Pat. No. 3,485,797. As the benzylic ether type phenol resin used in this invention, liquid one is especially suitable.

Such a benzylic ether type phenol resin containing hydroxymethyl groups can contain hydroxyl groups derived from the hydroxymethyl groups in a range of generally 300 to 700 mg KOH/g, preferably 450 to 600 mg KOH/g in terms of a hydroxyl value.

Although the benzylic ether type phenol resin containing hydroxymethyl groups can be used alone as the polyol component in this invention, when it is used alone, the curing rate gets too fast and cracks, etc. are liable to occur in the inside of the formed foam, and therefore, it is preferable, in general, to use it together with other polyols. As other polyols usable together, those which have so far been used in preparation of polyurethanes are usable, and there can, for example, be mentioned dihydric alcohols such as ethylene glycol, diethylene glycol, neopentene glycol, 1,4-butanediol, 1-6-hexanediol and 1,4-cyclohexanedimethanol; trihydric or higher alcohols such as glycerol, trimethylolpropane, tris(2-hydroxyethyl) isocyanurate and pentaerythritol; or polyester polyols, polyether polyols, etc. obtained using them. These other polyols can be used alone or in combination of two or more. Particularly suitable are phthalic ester polyols, ethereal Mannich polyols and ethereal ehtylenediamine polyols having a hydroxyl value in the range of generally 50 to 800 mg KOH/g, particularly 100 to 500 mg KOH/g.

In the case of use together with these other polyols, the use amount of the benzylic ether type phenol resin containing hydroxymethyl groups is not strictly limited and can be widely varied depending on physical properties desired for the foam to be formed, the kind of other polyols to be used together, etc., but is suitably in the range of usually 5 to 100 wt. %, particularly 30 to 80 wt. % based on the total amount of the polyols.

On the other hand, as the organic polyisocyanate component to be reacted with the polyol components, there can be used an aliphatic, alicyclic, aromatic, aromatic-aliphatic or another polyisocyanate compound containing two or more isocyanato groups (NCO) in one molecule, and as example thereof there can be mentioned aromatic polyisocyanates such as 2,4-toluene diisocyanate, 2,6-toluene diisocyanate, mixtures of 2,4-toluene diisocyanate with 2,6-toluene diisocyanate, crude toluene diisocyanate, methylenediphenyl diisocyanate polymethylenepolyphenylenepolyisocyanate (crude MDI), and 4,4',4"-triphenylmethylene triisocyanate; aliphatic polyisocyanates such as hexamethylene-1,6-diisocyanate and lysine diisocyanate methyl ester, and particularly preferable among them is polymethylenepolyphenylene polyisocyanate (crude MDI).

The suitable use ratio of the organic polyisocyanate component to the polyol component is in the range of generally 1 to 4, particularly 1.1 to 3.0 in terms of the NCO/OH equivalent ratio.

In this invention, an organotin catalyst for urethane formation and a carbodiimidating catalyst are used together as the reaction catalysts. As the organotin catalysts for urethane formation, there can, likewise, be used those generally used in reactions for urethane formation, and as examples thereof there can be mentioned dibutyltin dilaurate, dibutyltin diacetate, dibutyltindialkyl maleate, tin stearate, tin octanoate, etc. The use amount of the organotin catalyst for urethane formation is not particularly limited, but suitably in the range of usually 0.1 to 14 wt. %, particularly 2 to 9 wt. % based on the total amount of the polyols used.

Further, in this invention, there can, if necessary, be used together other catalysts for urethane formation for regulation of the reaction rate. As other catalysts for urethane formation which can be used together, there can, for example, be mentioned tertiary amine catalysts such triethylenediamine, 2-methyltriethylenediamine, bis-2-dimethylaminoethyl eher, N,N', N"-trimethylaminoethylethanolamine, N,N-dimethylaminoethylmorpholine, 1-isobutyl-2-methylimidazole, 1,8-diazabicyclo(5.4.0)undecene-7 and 1,5-diazabicyclo(4.3.0)-nonene-5 and their derivatives; salts of these tertiary amine catalysts with acids such as carboxylic acids; organomethallic salt catalysts such as cobalt naphthenate, tetra(2-ethylhexyl) titanate, ferric 2-ethylhexoate, cobalt 2-ethylhexoate and zinc naphthenate; etc.

In this invention, in order to enhance the flame retardancy of the foam, it is possible, if necessary, to make nulation by addition of a trimerizing catalyst. As usable trimerizing catalysts, there can, for example, be mentioned tertiary amine catalysts such as N,N',N"-tris(dimethylaminopropyl)hexahydro-S-triazine and 2,4,6-tris(dimethylaminomethyl)phenol; organometallic salt catalysts such as potassium acetate, potassium octanoate, potassium 2-ethylhexanoate, sodium carbonate and iron oxalate; etc. Such trimerizing catalysts can be used in the range of generally 0 to 10 wt. %, particularly 0.1 to 2 wt. % based on the total amount of the polyol components to be used.

On the other hand, as the carbodiimidating catalyst to be used together, there can be used a catalyst known as one catalyzing carbodiimidation reaction as shown in the above reaction formula B, and as examples thereof there can be mentioned organic phosphorous compounds such as triphenylphosphorene oxide, hexamethylenephosphonamide, dilaurylphpsphonamide, triethyl phosphate, triallyl phosphate, 1-phenyl-3-methyl phosphate and 1-phenyl-3-methylphosphorene oxide; trizaine ring-containing tertiary amine compounds such as 1,3,5-tris(N,N-dialkylaminoalkyl)-S-hexahydrotriazine derivatives; organometallic compounds such as titanium tetrapropoxide and zirconia tetrapropoxide; etc., and among them 1-phenyl-3-methyl-phospholene oxide is preferred.

The use amount of such a carbodiimidating catalyst is not strictly limited, either, but, in general, it is suitable that the use amount is in the range of 0.05 to 4 wt. %, particularly 0.1 to 2 wt. % based on the organic polyisocyanate to be used.

Further, in this invention, it is desirable, in some case, to use water as a blowing auxiliary. However, when its use amount is too large, the resultant foam tends to get brittle, and therefore, in general, it is preferred to use water in an amount of 0.1 to 4 wt. %, particularly 0.5 to 2 wt. % based on the organic polyisocyanate.

Further, in this invention, there can properly be compounded other additives often used in preparation of polyurethane foams, for example, foam stabilizers such as ethylene oxide or propylene oxide adducts of dimethylsilicon, nonionic surfactants and anionic surfactants; flame retardants such as tris(2,3-dibromopropyl) phosphate, tris(2-chloroethyl) phosphate, tris(β-chloropropyl) phosphate and trimethyl phosphate; viscosity-reducing agents such as dibutyl phosphate, dioctyl phosphate and polypropylene carbonate; fillers such as antimony trioxide, zeolite and hazilite; coloring agents such as pigments and dyes; etc.

As a process for preparing a polyurethane-polycarbodiimide foam using the above various components, there can, for example, be exemplified a process which comprises preparing a polyol composition in advance by mixing all the components other than the organic polyisocyanate component, adding the organic polyisocyanate component to this polyol composition and mixing the mixture, pouring it into a mold or spraying (e.g. by a spray blowing machine) it on the surface of a base material, and then blowing and curing it. Time required for the blowing and curing is usually on the order of 5 to 30 seconds.

According to the process of this invention, by controlling the benzylic ether type phenol resin, the organotin catalyst for urethane formation, the carbodiimidating catalyst, water (blowing auxiliary), etc., the extent of foaming of the formed foam can be regulated freely, and for example, it is possible to prepare a foam having an extent of foaming as large as its free foaming density being 18 to 40 kg/m$^3$, particularly 20 to 30 kg/m$^3$.

Further, polyurethane-polycarbodiimide foams prepared by the process of this invention are improved in physical properties such as the lowness of adhesive property and brittleness which have come into problems in usual foams by water blowing. Further, when a foam having a large extent of foaming is prepared, in usual water blowing the viscosity of the stock solution gets high and thus it is necessary to mix large amounts of a flame retardant and a viscosity-reducing agent at the time of spray blowing, whereas according to the process of this invention, it is possible to prepare a stock solution of 300 to 500 c.p. easily only by mixing a flame retardant in an amount of the order of 10%.

This invention is described more specifically below by examples.

| Examples 1 to 15 | |
| --- | --- |
| Benzylic ether type phenol resin having hydroxymethyl groups (hydroxyl value: 596 mg KOH/g; BEP-1000 produced by HOTOGAYA CHEMICAL CO., LTD.) | 10 g |
| Phthalic ester polyol (hydroxyl value: | 4 g |

-continued

| Examples 1 to 15 | |
| --- | --- |
| 210 mg KOH/g; PL-135 produced by Tohorika Co., Ltd.) | |
| Organotin catalyst for urethane formation (dibutyltindialkyl maleate salt; T-52NJ produced by Katsuta Kako Co., Ltd.) | 0.5 g |
| Catalyst for urethane formation (salt of triethylenediamine with carboxylic acid; DABCO 8154 produced by Sankyo Air Products Co., Ltd.) | 1.5 g |
| Trimerizing catalyst [2,4,6-tris (dimethylaminomethyl)phenol; TMR-30 produced by Sankyo Air Products Co., Ltd.] | 2 g |
| Carbodiimidating catalyst (1-phenyl-3-methyl-phospholene oxide; 33% solution in N-methyl-2-pyrrolidone) | 0.5 g |
| Foam stabilizer (CF2012 produced by Toray Silicone Co., Ltd.) | 1 g |
| Flame retardant [tris(β-chloropropyl) phosphate; Anflarm 3PX produced by Nippon Oil and Fats Co., Ltd.] | 5 g |
| Water | 0.5 g |

Each of the above components was weighed into a 750-ml vessel, and after preliminary stirring, 50 g of polymethylenepolyphenylenepolyisocyanate (crude MDI) (CR200 produced by Nippon Polyurethane Co., Ltd.) was added, and the mixture was intensely stirred at room temperature and 2,000 r.p.m. for 1 to 2 seconds using a cage stirrer and blown and cured as such in a cup-free state. The density (free foaming density) of the resultant foam and cream time and rise time are shown in the following Table 1.

Further, the same operations as above were made using each component of the composition and the compounding rate shown in the following Table 1 to prepare foams. The density, cream time, rise time and the state of foams thereof are shown in Table 1, too.

TABLE 1

| Raw material component | Example | | | | | | | | | | | | |
| --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 |
| Crude MDI | 50 | 50 | 50 | 50 | 50 | 50 | 50 | 50 | 50 | 50 | 50 | 50 | 50 |
| Benzylic ether type phenol resin | 10 | 4 | 7 | 14 | 10 | 10 | 10 | 10 | 10 | 10 | 10 | 4 | 14 |
| Polyol PL-135 | 4 | 10 | 7 | — | 4 | 4 | 4 | 4 | 4 | 4 | 4 | 10 | — |
| PL-253 | — | — | — | — | — | — | — | — | — | — | — | — | — |
| XR-3000R | — | — | — | — | — | — | — | — | — | — | — | — | — |
| Catalyst for urethane formation | 1 | 1 | 1 | 1 | 1 | 1 | 1 | 1 | 1 | 1 | 1 | 1 | 1 |
| Trimerizing catalyst | 2 | 2 | 2 | 2 | 2 | 2 | 2 | 2 | 2 | 2 | 2 | 2 | 2 |
| Organotin catalyst for urethane formation | 0.5 | 0.5 | 0.5 | 0.5 | 0.1 | 0.5 | 0.5 | 0.5 | 0.5 | 0.5 | 0.5 | 0.5 | 0.5 |
| Carbodiimidating catalyst | 0.5 | 0.5 | 0.5 | 0.5 | 0.5 | 0.5 | 0.1 | 2.0 | 0.1 | 2.0 | 0.1 | 0.5 | 0.5 |
| Foam stabilizer | 1 | 1 | 1 | 1 | 1 | 1 | 1 | 1 | 1 | 1 | 1 | 1 | 1 |
| Flame retardant | 5.5 | 5.5 | 5.5 | 5.5 | 5.9 | 4.5 | 5 | 5 | 5.9 | 4.0 | 4.4 | 6.0 | 6.0 |
| Water | 0.5 | 0.5 | 0.5 | 0.5 | 0.5 | 0.5 | — | — | 0.5 | 0.5 | 2.0 | — | — |
| Cream time (sec) | 2 | 3 | 3 | 1.5 | 2 | 2 | 2 | 2 | 3 | 2.5 | 3 | 2 | 2 |
| Rise time (sec) | 10 | 22 | 10 | 5 | 13 | 21 | 20 | 30 | 10 | 18 | 4 | 51 | 13 |
| Density (kg/$^3$m) | 20.0 | 24.0 | 25.0 | 18.1 | 22.6 | 20.1 | 27.5 | 23.5 | 23.7 | 17.2 | 15.9 | 39.6 | 25.8 |
| State of foams | ◉ | ◉ | ◉ | ○ | ◉ | ◉ | ◉ | ◉ | ◉ | ○ | ○ | ◉ | ○ |

Sate of foams
◉: good
○: almost good
x: not good

COMPARATIVE EXAMPLES 1 TO 4

For comparison, the same operations as in Example 1 were made using each component of the same composition as in Example 1 and compounding rates shown in the following Table 2 to prepare foams. The cream time, rise time, density and the state of foams thereof are shown in Table 2.

TABLE 2

| Comparative example | 1 | 2 | 3 | 4 |
|---|---|---|---|---|
| Crude MDI | 50 | 50 | 50 | 50 |
| Benzylic ether type phenol resin | 10 | 10 | 10 | — |
| Polyol PL-135 | 4 | 4 | 4 | 14 |
| Catalyst for urethane formation | 1 | 1 | 1 | 1 |
| Trimerizing catalyst | 2 | 2 | 2 | 2 |
| Organotin catalyst for urethane formation | — | 0.5 | 0.5 | 0.5 |
| Carbodiimidating catalyst | 0.5 | — | — | 0.5 |
| Foam stabilizer | 1 | 1 | 1 | 1 |
| Flame retardant | 6 | 6.5 | 6 | 5.5 |
| Water | 0.5 | — | 0.5 | 0.5 |
| Cream time (sec) | 3 | 3 | 3 | 3 |
| Rise time (sec) | 17 | 15 | 9 | 14 |
| Density (kg/m$^3$) | 29.8 | 35.5 | 30.9 | 48.8 |
| State of foams | x cracks found | x cracks found | x cracks found | x only a little foaming |

EXAMPLES 14 TO 21

The same operations as in Example 1 were made except that the benzylic ether type phenol resin, the catalyst for urethane formation, the trimerizing catalyst and the organotin catalyst among the components of Example 1 were replaced by components shown in the following Table 3, whereby foams were prepared. The cream time, rise time, density and the state of foams thereof are shown in Table 3.

TABLE 3

| | | Example | | | | | | | |
|---|---|---|---|---|---|---|---|---|---|
| | | 14 | 15 | 16 | 17 | 18 | 19 | 20 | 21 |
| Crude MDI | | 50 | 50 | 50 | 50 | 50 | 50 | 50 | 50 |
| Benzylic ether type phenol resin | (hydroxyl value) | | | | | | | | |
| | 596 mg/KOH g | 9.3 | 9.3 | — | — | 10 | 10 | 10 | 10 |
| | 485 mg/KOH g | — | — | 10 | — | — | — | — | — |
| | 557 mg/KOH g | — | — | — | 10 | — | — | — | — |
| Polyol (*1) | PL-135 | — | — | 4 | 4 | 4 | 4 | 4 | 4 |
| | PL-253 | 25.5 | — | — | — | — | — | — | — |
| | XR-3000R | — | 25.5 | — | — | — | — | — | — |
| Catalyst for urethane formation (*2) | DABCO-8154 | 2 | 2 | 1 | 1 | — | — | 1 | 1 |
| | DABCO-33LV | — | — | — | — | 1 | — | — | — |
| | SA 102 | — | — | — | — | — | 1 | — | — |
| Trimerizing catalyst (*3) | TMR-30 | — | — | 2 | 2 | 2 | — | — | 2 |
| | NKC | — | — | — | — | — | 2 | 2 | — |
| Organotin catalyst for urethane formation (*4) | T-52NJ | 1 | 1 | 0.5 | 0.5 | — | — | 0.5 | 0.5 |
| | T-9 | — | — | — | — | 0.5 | 0.5 | — | — |
| Carbodiimidating catalyst | | 0.5 | 0.5 | 0.5 | 0.5 | 0.5 | 0.5 | 0.5 | 0.5 |
| Foam stabilizer | | 1 | 1 | 1 | 1 | 1 | 1 | 1 | 1 |
| Flame retardant | | 10 | 10 | 5.5 | 5.5 | 5.5 | 5.5 | 5.5 | 5.5 |
| Water | | 0.75 | 0.75 | 0.5 | 0.5 | 0.5 | 0.5 | 0.5 | 0.5 |
| Cream time (sec) | | 2 | 2 | 3 | 3 | 3 | 3 | 3 | 2 |
| Rise time (sec) | | 8 | 8 | 8 | 12 | 8 | 10 | 7 | 7 |
| Density (kg/m$^3$) | | 25.0 | 29.0 | 21.8 | 19.6 | 20.4 | 23.9 | 19.0 | 20.9 |
| State of foams | | ⊙ | ⊙ | ⊙ | ⊙ | ⊙ | ⊙ | ⊙ | ⊙ |

(*1) Polyol
PL-253: phthalic ester polyol produced by Toho Rika Co., Ltd.
XR-3000R: Ethereal Mannich polyol produced by A.G.C.
(*2) Catalyst for urethane formation
DABCO-33LV: 33% solution of triethylenediamine in ethylene glycol, produced by Sankyo Air Products Co., Ltd.
SA102: Salt of diazabicyclo (5.4.0) undecene-7 with 2-ethylhexanoic acid, produced by Sun-Apro Co., Ltd.
(*3) Trimerizing catalyst
NKC: 50% solution of potassium octanoate in glycerol produced by Katsuta Kako Co., Ltd.
(*4) Organotin catalyst for urethane formation
T-9: Stanus-2-ethylhexoate produced by M&T Co., Ltd.

TEST EXAMPLE

Blowing was carried out using a Gasmer spray blowing machine and each component of the compositions of Examples 1, 3, 14 and 15. The cream time, rise time, density and adhesion to a gypsum board at the time are shown in the following Table 4.

TABLE 4

| Example | 1 | 3 | 14 | 15 |
|---|---|---|---|---|
| Cream time (sec) | 3 | 4 | 3 | 3 |
| Rise time (sec) | 9 | 13 | 11 | 10 |
| Density (kg/m$^3$) | 27 | 42 | 35 | 40 |
| Adhesion | good | good | good | good |

What is claimed is:

1. A process for preparation of a polyurethane-polycarbodiimide foam which comprises reacting a polyol component containing a benzylic ether phenol resin having hydroxymethyl groups and further containing a phthalic ester polyol, an ethereal Mannich polyol or an ethereal ethylenediamine polyol each having a hydroxy value of 50 to 800 mg KOH/g, with an aromatic polyisocyanate component in the presence of an organotin catalyst for urethane formation and a carbodiimidating catalyst which is 1-phenyl-3-methyl-phospholene oxide, wherein the polyol component and the aromatic polyisocyanate component are used in such a ratio that the NCO/OH equivalent ratio is 1 to 4.

2. The process according to claim 1 wherein the benzylic ether phenol resin has a hydroxyl value of 300 to 700 mg KOH/g.

3. The process according to claim 1 wherein the polyol component contains 20 to 100 wt. % of the benzylic ether phenol resin based on the total amount of the polyol.

4. The process according to claim 1 wherein the aromatic polyisocyanate component comprises polymethylenepolyphenylenpolyisocyanate.

5. The process according to claim 1 wherein the organotin catalyst for urethane formation is used in a range of 0.5 to 14 wt. % based on the total amount of the polyols.

6. The process according to claim 1 wherein the carbodiimidating catalyst is used in a range of 0.05 to 4 wt. % based on the aromatic polyisocyanate.

7. The process according to claim 1 wherein water is used as a blowing auxiliary.

8. The process according to claim 7 wherein water is used in an amount of 0.1 to 4 wt. % based on the aromatic polyisocyanate.

9. The process according to any of claims 1 to 5 whereby a polyurethane-polycarbodiimide foam having a free foaming density of 18 to 40 kg/m$^3$ is prepared.

10. A polyurethane-polycarbodiimide foam prepared by the process according to claim 1.

11. A polyol composition containing a benzylic ether phenol resin having hydroxymethyl groups and further containing a phthalic ester polyol, an ethereal Mannich polyol or an ethereal ethylenediamine polyol each having a hydroxyl value of 50 to 800 mg KOH/g, an organotin catalyst for urethane formation and a carbodiimidating catalyst which is 1-phenyl-3-methyl-phospholene oxide.

* * * * *